Patented Aug. 14, 1951

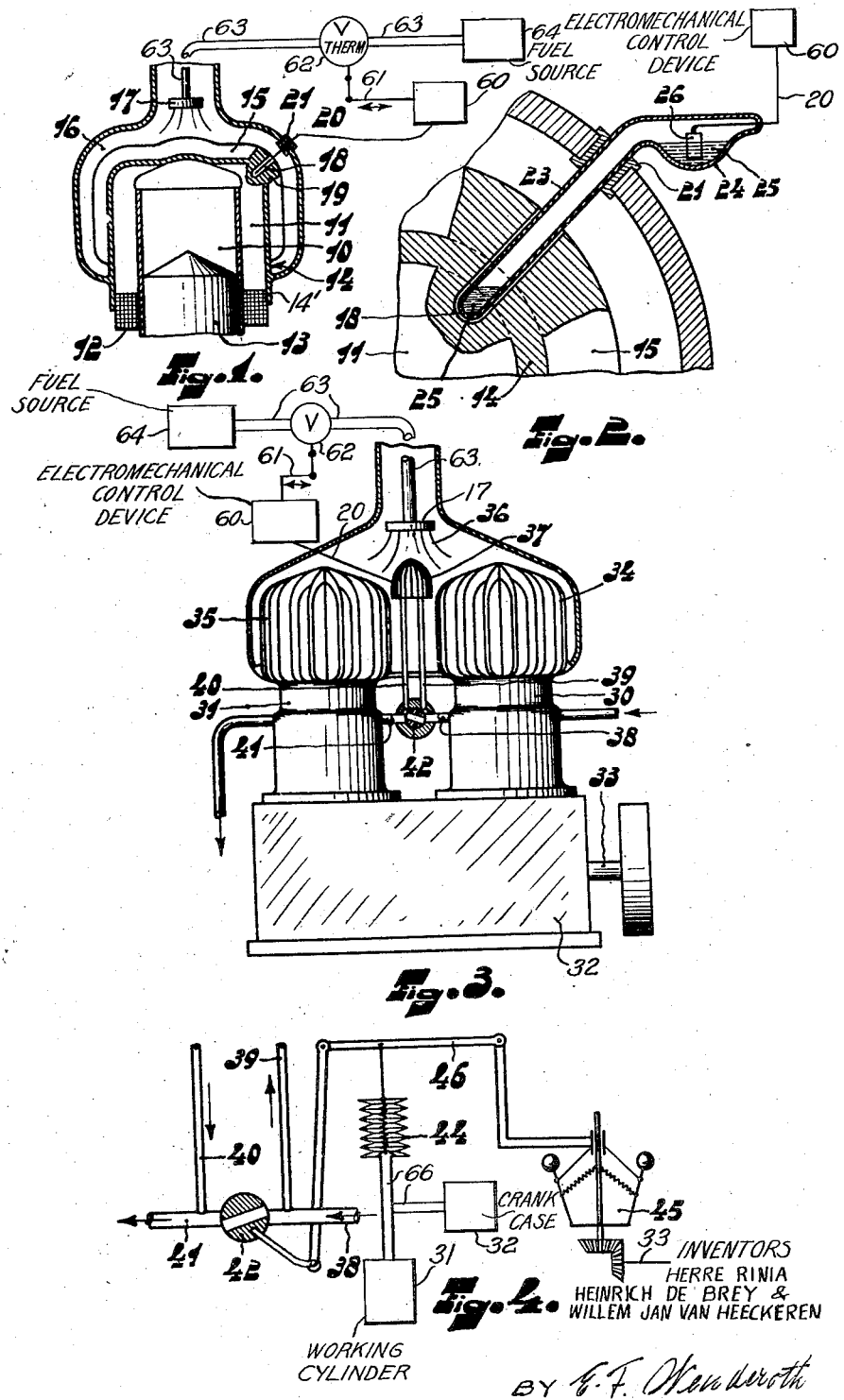

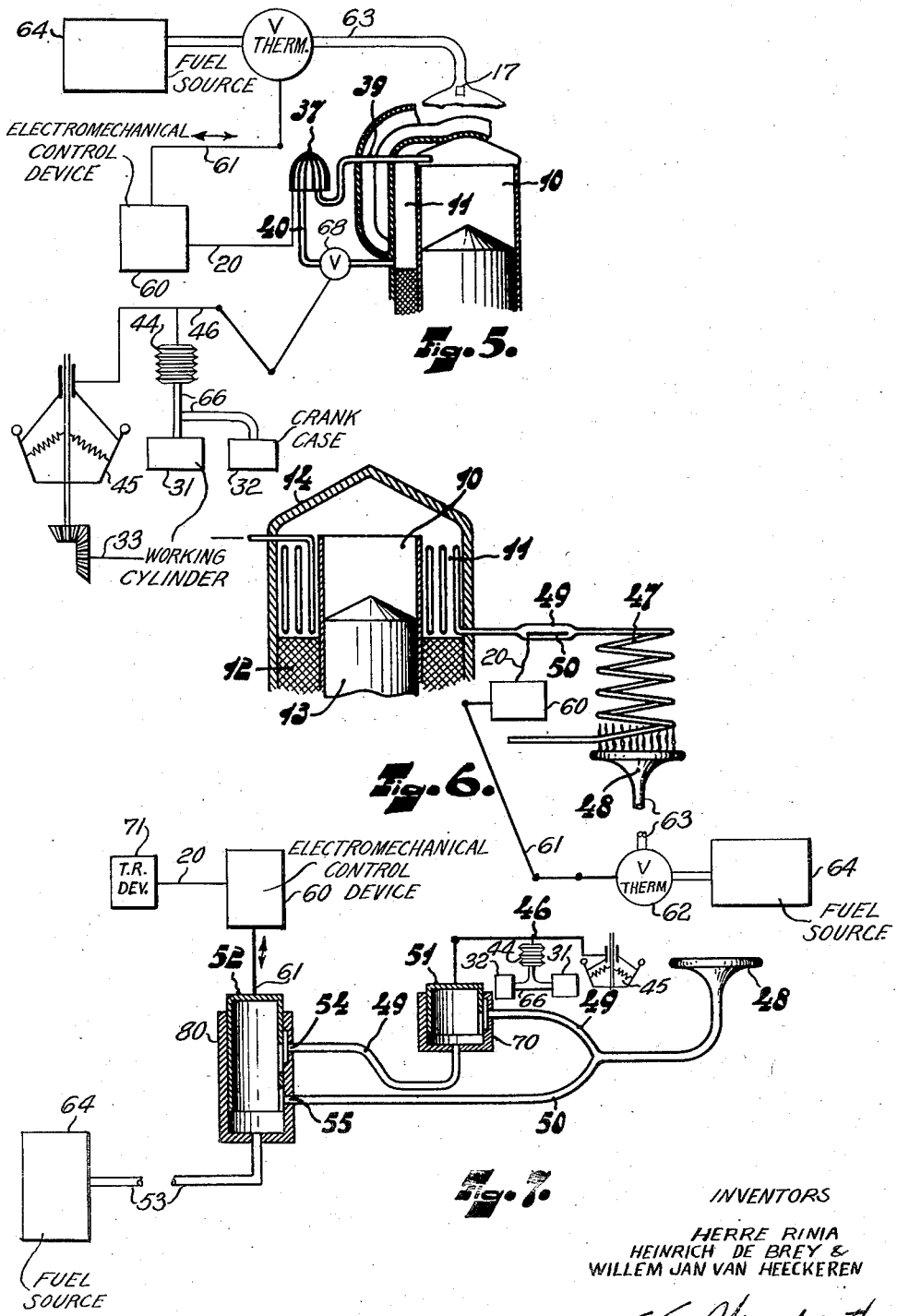

2,564,097

UNITED STATES PATENT OFFICE 2,564,097

HOT-GAS ENGINE WITH AUTOMATICALLY CONTROLLED HEATING MEANS

Herre Rinia, Heinrich de Brey, and Willem Jan van Heeckeren, Eindhoven, Netherlands, assignors to Hartford National Bank & Trust Company, Hartford, Conn., as trustee Application September 5, 1945, Serial No. 614,571
In the Netherlands May 22, 1943

Section 1, Public Law 690, August 8, 1946
Patent expires May 22, 1963

6 Claims. (Cl. 60—24)

This invention relates to a hot-gas engine and more particularly to a heat controlling system for the same.

The term "hot-gas engine" is to be understood to mean a thermodynamic prime mover in which a thermodynamic circuit is passed through by a body of gas confined within an enclosure having a variable volume in which or in open connection with which a heating portion is arranged, in some cases a regenerator, and in addition a cooling portion which is moreover arranged in or in open connection with a second enclosure of variable volume. The space adjoining the heating portion is referred to as the hot space; the space adjoining the cooling portion as the cold space.

Part of the body of gas contained in the said enclosure may, if necessary, be admitted into one or more single closed tubes or vessels and subsequently be readmitted from one or more of these tubes or vessels into the said enclosures. In all these cases the thermodynamic cycle is called a closed cycle.

In some cases the cooling portion of the engine may be omitted and a periodical connection to the atmosphere be substituted for it; in this case a fresh supply of air is drawn in for each cycle. Engines of this kind are called open-cycle engines. Both in the case of open-cycle and closed-cycle engines there is such a phase difference between the changes in volume of the hot and cold spaces that the gas is subjected in succession to heating, expansion, cooling and compression.

Since the isothermal efficiency of a hot-gas engine is fixed by the relation:

$$\frac{T_w - T_k}{T_w}$$

$T_w$ denoting the absolute temperature prevailing on the hot side of the engine and $T_k$ the absolute temperature prevailing on the cold side of the engine, it is important in the first place in producing a satisfactory efficiency to maintain the temperature on the hot side of the engine as high as possible and on the cold side of the engine as low as possible. The temperature on the hot side of the engine is dependent upon the heat supplied by the heating device and the yield of heat in the working medium of the engine. But for taking particular precautions the temperature on the hot side will therefore in the case of a fluctuating load, fluctuate as well, so that the efficiency is variable.

A primary object of this invention is to provide means in a hot-gas engine for attaining the highest possible isothermal efficiency consonant with a high factor of structural safety.

Another object of this invention is to provide a multiple heat controlling system for a hot-gas engine.

A further object of this invention is to provide a thermostatically controlled heating system for a hot-gas engine.

Another object of this invention is to provide a dual heat control system for a hot-gas engine.

A still further object of this invention is to provide an augmented temperature responsive heat control system for a hot-gas engine.

Other objects, features and advantages of this invention will become apparent as the description proceeds hereinafter.

In the drawing:

Fig. 1 is a diagrammatic view of a heating system for a hot-gas engine shown in an elevation section view comprising a temperature controlling device coupled to a temperature responsive device, the latter being in direct thermal connection with the material of this heating device.

Fig. 2 is a sectional view of a component member of a heating system of the above kind including an intermediate thermal conductive connection between the temperature responsive device and the material of the heater shown in partial vertical section.

Fig. 3 shows another embodiment of the inventive concept in a multi-cycle hot-gas engine including a single temperature responsive device in the flame and flue gases.

Fig. 4 is a diagrammatic view of speed and pressure responsive controls augmenting the temperature responsive device shown in Figs. 1 to 3.

Fig. 5 shows a further embodiment of the invention which may be applied to the engine shown in Fig. 3 with the augmenting controls of Fig. 4.

Fig. 6 is a combined diagrammatic view of a heating system and control for same, and a partial vertical sectional view of the heating system and of the subject engine wherein the temperature responsive device is inserted within the heating medium input means and;

Fig. 7 is a diagrammatic view of another embodiment of a dual control system similar to that shown in Fig. 4.

According to the present invention, means are provided for maintaining the temperature of the heater material constant in the case of a fluctuating load. The concept according to the invention permits of ensuring that the temperature of the heater material is maintained constant and as high as is permissible in view of the mechanical strength of the material designed for maximum engine load and that consequently the thermal efficiency remains a maximum in the case of a fluctuating load. The term "heater material" is to be understood to mean that material participating in the heat transmission from the source of heat to the gaseous medium in the widest sense.

It is known to secure a control of the heater or engine head temperature of a hot-gas engine by causing the control of the heat supply to be influenced by the temperature of the flue gases escaping from the heater. This control does, however, not ensure a constant temperature of the heater material since the flue gas temperature is not the only decisive factor for the temperature of the heater.

The means for controlling the temperature of the heater may comprise a known thermostat used for temperature control. According to one embodiment of the invention, a temperature responsive device associated with this thermostat may be arranged in thermal connection with the heat-exchanging means of the heater. In this case, the supply and elimination of heat to and from this temperature responsive device is carried out in a manner entirely similar to that done for the material of the heater parts so that the temperature changes which this temperature responsive device suffers are entirely similar to those to which the heater material is exposed.

The said thermal connection may be realized for example by arranging the temperature responsive device in, between or on the heat-exchanging means of the heater, the device being thus, so to say structurally, united with the heater. It is also possible to arrange a direct thermal conductor between the material of the heater and the said temperature responsive device in the form of a heat-conducting metal body, a volatilizing liquid or a conductive flow of gas. In the latter cases, the temperature of the temperature responsive device is not likely to be identical with the temperature of the heater material on account of the loss of heat in the said conductive means, but the variations in temperature can be transmitted to the temperature responsive device in a virtually proportional manner.

If it is difficult to find sufficient accommodation in or immediately adjacent the heater for fitting a temperature responsive device, it is possible, according to an embodiment of the invention, to cause the temperature responsive device to be heated by the flame gases and to make provisions at the same time, with the aid of a further means, for so conducting away the heat from this responsive device that this elimination of heat is carried out in a manner irrespective of the energy developed by the engine. In this case, the working conditions of the responsive device are equalized with those under which the heater material is subjected to the heat transmission, since the supply and elimination of heat is effected in an identical manner. Therefore, the temperature of the responsive device is a true reflection of the temperature of the heater material. The use of this construction permits the control device being spaced apart from the engine cylinder. Therefore, for example, for a multi-cylinder engine a single control device suffices.

For the elimination of heat from the temperature responsive device use may be made of a medium which is provided in an engine in any case, for example the gaseous working medium in the cylinder or the cooling medium which is provided for conducting the heat away from the cooler.

In the former case, in which the working medium is consequently used, there is no necessity for providing a separate power control for this elimination of heat since the quantity by weight of circulating medium per time unit is a measure of the indicated engine power. In this case it suffices for part of the gaseous medium that leaves the hot space to be conducted along the temperature responsive device rather than through the heater, a regular elimination of heat being thus effected.

The latter case, in which use is made for example of the cooling water, the quantity of cooling water per time unit must be controlled by the indicated power in the engine, a control device controlled by the engine being therefore generally provided in the supply of cooling water to the temperature responsive device. Instead of using a controllable quantity of cooling water for the elimination of heat, use may be made of a controllable thermal resistance between the temperature responsive device and a continually cooled point.

If the hot-gas engine concerned is equipped with a device for pre-heating the combustion air necessary for this source of heat, the quantity of this air per time unit is also in some cases used for the conducting away of heat from the temperature responsive device.

In a further embodiment of the engine according to the invention, there is between the source of heat of the engine and the heater a heat conveying liquid which has the heat supplied to it by the intermediary of a wall. This transmits the heat as a rule at another point also via an intermediary wall to the medium active in the engine. The temperature responsive device can be caused to be influenced by the temperature of this heat-conveying liquid, since if the engine starts to reliver more energy at a given moment, thus withdrawing more heat from the heater, the temperature of the liquid heat-conveying medium will fall off. Due to the fact that the device reacts with this fall in temperature it is possible for the source of heat to be so influenced by this reaction as to transmit more heat to the heat-conveying medium, so that in turn this medium transmits more heat to the heater.

In connection with efficiently protecting the heating device it may be important in the use of a liquid as the heat-conveying medium to arrange the temperature responsive device in direct connection with the heating device of this intermediate medium or in other words close to the source of heat. Any over-heating of this heating device due to disturbances in the conveyance of the heat-conveying medium is prevented by such attachment.

In certain cases the control mechanisms above-described for maintaining constant the heater temperature will nevertheless be too inert and there will thus still be the possibility of overheating the heater material.

According to a further embodiment of the engine according to the invention, in order to obviate this difficulty it is possible to cause the heating device to be controlled by the indicated power in the engine. Therefore, if for example at a given moment less power is produced by the engine the latter has less heat supplied to it. In this case the above-described control mechanism may act as a course control mechanism so as to correct the control of the heat supply to the engine; this control is always more or less coarse and is effected by the power control of the engine.

If for certain reasons we tolerate the material of the heater being only protected from the occurrence of excessive temperature it is possible according to a further embodiment of the engine according to the invention, to couple the control of the heating device with the control mechanism of the power produced in the engine and to cause the temperature control described hereinbefore to serve solely for protecting the heater from the occurrence of excessive temperatures.

In order that the invention may be clearly understood and readily carried into effect it will now be described more fully with reference to the accompanying drawing, in which several embodiments are illustrated.

Referring to Fig. 1, 10 designates the hot chamber of the cylinder of a hot-gas engine; 11 designates the heater which comprises several known narrow pipes or passages through which the flow of gas is forced by the movement of the displacer 13. As usual, there is adjacent this heater a regenerator 12 associated with which are further parts of the engine not essential for an understanding of the present invention. The walls of the heater 11 are integral with the sheath or wall 14' of the cylinder 14. This cylindrical sheath is provided externally with several ribs 15 arranged in a flame gas passage 16. The burner 17 ensures the supply of the required heat which by means of the ribs 15 on the wall 14' and the walls of the heater 11 is transmitted to the flowing gas.

For producing the maximum thermal efficiency of this engine it is essential that the temperature of the gases in the heater 11 and hence also the temperature of the material of this heater and the wall of the engine should be maintained as high as possible. The highest permissible temperature, however, is limited by the mechanical strength of the material used, which decreases as the temperature rises. Rises in temperature are therefore not permissible from the structural viewpoint; falls in temperature diminish the efficiency so that as constant a temperature as possible of the material of the heater is endeavoured to be obtained. For this purpose, the engine comprises a control system for the heat supply which will be set out in detail hereinafter. This control system comprises inter alia a temperature responsive device 19; the latter should follow the temperature fluctuations in the material of the heater. In the embodiment here described, this temperature responsive device 19 is therefore directly housed in a bore 18 in the material of the heater so that there is a direct thermal connection between heater and temperature responsive device. Temperature fluctuations in the heater material are consequently transmitted direct to the temperature responsive device 19. Such a temperature responsive device may be made up, for example, of two different metals which are in contact with each other. The contact potential between these two metals is dependent upon the temperature of the connecting point between these two metals; temperature fluctuations are therefore perceptible as potential variations. This electric tension is taken out by means of two wires 20 in a gastight and insulated manner with the aid of a small insulated cylinder 21 through the wall of the flame-gas passage 16 and conducted to any known and convenient electromechanical control device 60 including a thermostat and having a linkage coupling 61 attached to a known valve 62. Valve 62 is interposed between a fuel source 64 and the burner 17 through the intermediary of ducts 63. When the engine temperature reaches a predetermined point the electrical output of the temperature responsive device 19 is sufficient to produce an effect upon the valve 62 through the control device 60 acting on the linkage 61 and thereby the fuel input to the burner 17 is altered. Thus, it is seen that engine temperature changes are reflected into the fuel control of the subject engine in an entirely automatic manner. Also, excessive engine temperatures are not reached when the above heating system is employed, since a definite electrical output of the device 19 produced by a maximum permissible engine temperature can be used to entirely shut off the heat supply if necessary.

If the material or the construction of the heater does not allow the temperature responsive device being housed in the latter direct or if the temperature responsive device used does not lend itself to this purpose it is possible to arrange a thermal conducting connection between the material of the heater and the temperature responsive device used. For this purpose, any thermally conducting body capable of withstanding the occurring high temperatures without detrimental effect is essentially serviceable. Thus for example, it is possible to insert a simple copper or bronze rod between the heater and the temperature responsive device. No doubt a loss of heat will be set up in this rod by radiation and convection so that the temperature adjacent the responsive device is lower than that of the heater material but since only variations in temperature are important in this case, this fall in temperature need not be an obstacle to the outcome. The time for which a temperature variation, however, takes to reach the responsive device from the heater material through the rod delays the control, so that other constructions by which this time is minimized are preferred.

Fig. 2 shows an embodiment in which this time is minimized even at comparatively large distances. The bore 18 of the heater shown in Fig. 1 of the hot-gas engine has fitted in it one end of a narrow metal tube 23. At the other end, this tube comprises a cup-like widening 24 in which the temperature responsive device 26 is housed. This tube is filled in part with a liquid 25 whose boiling point is in excess of the normal working temperature of the hot-gas engine.

The quantity of liquid is sufficiently large that not only the cup-like part 24 is filled but also the bottom end of the tube arranged in the bore 18. The liquid contained in the material of the heater will regularly volatilize due to the high temperature prevailing therein, ascend through the tube 23 and be condensed in the cup-like part 24 since the latter transmits heat to the outside by thermal radiation. This condensing liquid will therefore transmit heat regularly to the responsive device 26 and flow back to the lowermost part across the edge of the cup. If next the temperature of the material of the heater rises slightly, a larger quantity of liquid will evaporate at once from the bottom end of the tube 23 and consequently more heat per time unit will be conveyed to the cup-like part 24. The temperature of the responsive device 26 rises immediately and the control means 60 may become operative in the same manner described above.

Fig. 3 shows a twin-cylinder hot-gas engine provided with a temperature responsive device which is spaced away from the heaters. The two working cylinders 30 and 31 are seated on a common crank case 32 and have a common crankshaft 33. Either of the cylinders comprises a heater of the construction described with reference to Fig. 1. These two heaters 34 and 35 are arranged in a common flue-gas pipe into which the flame gases are propelled by the burner 36. Though it is possible to fit the temperature responsive device in a manner described by referring to Figs. 1 and 2, providing either but one or all of the cylinders each with a temperature responsive device of its own, it is more simple in the case of multi-cylinder engines to arrange only a single temperature responsive device 37 incorporating an element to be described hereinafter for all cylinders in the common flame-gas passage. In this case the temperature responsive device has the heat supplied to it direct from the flame gases. In order to render the working conditions of this responsive device entirely similar to those of the heater so that the temperature of this responsive device is a true reflection of the temperature of each of the heaters it is also necessary to make provision for a heat discharge element which conducts the heat away in proportion to the power of the engine. This enables the entire responsive device to be constructed so as to be considerably smaller than each of the heaters 34 and 35 but if the reception of heat and the yield of heat are both a proportionate part of the heat that is absorbed in each of the cylinders it can be ensured that the temperature of the responsive device is equal to that of the heaters.

This elimination of heat generally requires cooling means whose heat dissipating power is in the present case variable in proportion to the indicated engine power.

Fig. 3 shows one embodiment of a construction suitable for this purpose. The heat is conducted away by cooling water which may be the cooling water used in the engine anyhow for cooling the cooler of the working cylinder. For the sake of simplicity the cooling of the responsive device is interconnected between those of the two cylinders. A conduit 38 is the cooling water exhaust of one of the cylinders and a conduit 41 the supply to the second cylinder 31. Off the conduit 38 is branched a much narrower tube 39 which conducts the cooling water to the temperature responsive device 37. This coil containing any convenient cooling liquid is returned through the conductor 40 from the coil to the cooling water conductor 41 through the cylinder 31. In addition, the conduits 38 and 41 are connected or interposed by a control cock 42 whose position is varied by the control mechanism described hereinafter and also controlled by the engine power. If the cock or valve 42 occupies an almost closed position nearly all the cylinder cooling water also flows through the cooling of the temperature responsive device so that a maximum quantity of heat is conducted away from it. If on the contrary the cock 42 is entirely open, only a very small part of the cooling water will flow through the temperature responsive device through the small conductor 39. This position of the cock is intended, for example, for the noload power demand, the dissipation of heat in the small quantity of passing cooling water being proportionate to the indicated engine power at no-load. On the engine power increasing the cock 42 is re-closed so that more cooling water flows through the responsive device 37. The position of the control cock 42 is fixed by the indicated power of the engine, as stated hereinbefore.

The mechanism by means of which the position of the cock 42 is controlled is shown in Fig. 4 and is motivated in accordance with changes of the engine power. The indicated engine power is fixed by two cooperative values or qualities of the working circuit or cycle viz. by the engine speed and the mean pressure during the cycle of operations. The speed or number of revolutions per second is transmitted by the intermediary of a centrifugal governor 45 to a lever 46 and in such a way that in the embodiment shown the point of application of the governor 45 on the lever 46 descends as the number of revolutions increases. The control by reference to the mean pressure in the working circuit is effected by means of a resilient bellows 44 which have the mean indicated pressure of the cycle supplied to them from cylinders 31 and 32 through ducts 66. Bellows 44 will expand at an increase in pressure and will thus cause the point of attachment of these bellows on the lever 46 to rise. The free end of this lever 46, which is consequently adjusted by mean pressure and number of revolutions, is connected to the control cock 42. Thus, it is seen that a dual control system or augmented temperature responsive heat control system for a hot-gas engine is produced.

Fig. 5 shows a further embodiment of the invention set out with reference to Figs. 3 and 4.

The engine heat is here conducted away from the temperature responsive device 37 by means of the gaseous medium that operates in the engine and the heat supply is again effected from the flue gases. The gaseous working medium in the engine is fed to the temperature responsive device during the cycle of operations from the hot to the cold chamber through the heater, regenerator and cooler and back in part by a pair of branch conduits 39 and 40. These conduits may be connected in one of the engine cylinders between heater and regenerator or heater and hot chamber respectively. The normal periodical flow of the gaseous medium, thus finds in addition to the flow resistance in the heater 11 a parallel connection by the conduits 39 and 40 and the temperature responsive device 37. The quantity of the gaseous medium which in this case flows outside the heater is dependent upon the flow resistance in the conductors 39 and 40. Fitting a small throttle 68 in one of these pipes in a manner similar to that shown in Fig. 4 permits of the quantity of gas and hence the elimination of heat being adjusted by the temperature responsive device.

When the flow of gas moving from the hot chamber 10 in the direction of the cold chamber flows through the temperature responsive device little heat will be taken in here because the temperature of the responsive device 37 and of the heater 11 is practically identical. In contradistinction to this, during the back stroke of the engine, when consequently the gas flows from the regenerator through the temperature responsive device 37, to the hot chamber, a considerable amount of heat will be transmitted from the temperature responsive device to the gas, since the gas from the regenerator is lower in temperature. Heat is consequently conducted away periodically, that is to say twice per revolution, once a small amount and once a large amount. The heat thus taken from a temperature responsive device is not lost for the working process, since the temperature responsive device constitutes so to say a parallel connection of the heater and hence also heats the gases flowing to the hot chamber.

Fig. 6 shows an embodiment of a hot-gas engine in which a liquid conveys heat between the source of heat and the heater of the engine. The source of heat is represented here by a burner 48 which heats a tube system 47 and sets up a flow in it by thermal action. In the heater 11, this heat is in turn transmitted to the gaseous medium in the engine. The temperature of this heat-conveying liquid is controlled on the one hand by the heat supply in the burner 48 and on the other hand by the periodical decrease of heat in the engine. A decrease of the engine power demand results in an increase of this temperature and this will also cause a rise in temperature of the material of the heater. As before, a constant temperature should be endeavoured to be obtained. Since the liquid-temperature is indicative of the temperature of the heater 11 a temperature responsive device 59 may be housed in this case in a widened portion 49 of the liquid pipe. This temperature responsive device is preferably placed in the flow of liquid to the burner 48 and just at the back of or fairly near the heater where the influence of the decrease in heat in the engine is first perceptible at all times. The temperature responsive device 59 controls a valve 62 in a fuel supply line 63 to the burner 48 with apparatus herein delineated in connection with the embodiments of the invention above.

Fig. 7 shows an embodiment in which the supply of heat to the engine, in this case the fuel supply to the burner 48, is not only controlled by means of the dynamic-control 60, used with a temperature responsive device as described in the preceding embodiments but provision is made in addition for a control of the fuel supply dependent upon the indicated engine power. As to the control mechanism controlled by the mean indicated pressure and the number of revolutions as described with reference to Fig. 4 the control lever 46 is used for the control of the fuel supply in one of the fuel pipes 49 through valve means 70. This fuel supply is consequently effected by the indicated engine power. Variations of the engine power consequently result in an immediate variation of the fuel supply, because a slide 51 within valve 70 worked by the lever 46 locally changes the effective internal sectional area of the pipe 49.

In addition, provision is made for a second control slide valve 80 of the differential type comprising two single opening control ports 54 and 55. The fuel supply from the fuel pipe 53 is supplied to this slide valve and both to the fuel pipe 49 described hereinbefore and to a fuel pipe 50 connected in parallel therewith. The control port 54 through which the fuel is supplied to the conduit 49 is continually open at a normal working temperature of the engine as long as this temperature remains below the limit permitted for the pressure stressed material of the engine. The control port 55 connected in parallel with port 54, however, acts as a governor even at normal working temperature. At the normal working temperature of the engine just so much fuel is supplied by the two conduits 49 and 50 together as is required by the indicated engine power. If the engine power varies as a result of a variation of the external load the pilot slide 51 becomes operative at once and as an approximation alters the quantity of fuel required to accord with these altered conditions. This adjustment is, however, not perfect so that a variation of the heater temperature is not entirely excluded. If such a variation actually occurs the temperature responsive device 71 including a thermocouple works the pilot slide 52 through the intermediary of the electromechanical device 60 with its linkage 61 and changes the supply of fuel through the pipe 50 in such a way that the fixed temperature is attained again. The control by means of the device 60 is so to say a fine control which, if necessary, is allowed to be carried out with a minimum inertia.

The slide 52 worked by the device 60 may be used if the operation of the engine is obstructed, for example in the case of a great increase of the external load, in order to interrupt the entire fuel supply. For this purpose, the control port 54 is so constructed that, although it does not become operative at normal temperature fluctuations it fully closes at once at an excessive temperature. It is only natural that the port 55 also closes in this case. This may be effected, for example, in this case by having the slide 52 pass through a given extreme position.

If accurate control of the temperature of the heater material is not desired, it may suffice to cause the heat supply to the heater to be fixed by the indicated power or in other words by the mean working pressure in the cycle of operations and the engine speed. A device for carrying out such a control is described extensively hereinbefore with reference to Figs. 4 and 7 so that there is no need for reiterating. In certain cases this control may even be considerably simplified if, for example, the number of revolutions of the engine is maintained constant by the provision of the governor. In this case, the factor "engine speed" of the controlling of the engine is constant so that the heat supply need only be controlled by the mean working pressure. Even more simple is the case when the hot-gas engine is coupled with an appliance having such a characteristic curve that at each speed the mean pressure can only assume one value in the state of equilibrium. In practice, such cases occur with centrifugal pumps for air and water, fans, marine machinery or the like. The mean pressure and number of revolutions are both variable here but are in a fixed relation to each other. In this case, the heat supply to the heater may be controlled solely by a device for adjustment of the engine power, usually the power hand lever.

What we claim is:

1. In a hot-gas engine with cylinder means the combination comprising heater means, temperature responsive means including a cooling element coupled to said heater means, control means electrically coupled to said responsive means, a burner, fuel supply means, means coupling said control means to said supply means, crankshaft means, engine cooling system means including a valve, engine speed responsive means, coupled to said crankshaft means, pressure responsive means coupled to said cylinder means, means coupling said pressure and speed responsive means respectively to said cooling valve in a cooperative sense, and circulation means coupled to said temperature responsive cooling element shunting said valve whereby dual temperature control of said heater means is attained.

2. A hot-gas engine comprising heater means, a source of heat for said heater means, thermostatic means responsive to the temperature in said heater means for controlling the amount of heat furnished by said heat source to said heater means, said thermostatic means having a part thereof within said heater means, means for cooling said part of said thermostatic means, and further means responsive to the indicated power of said engine for controlling operation of said cooling means.

3. In a hot-gas engine, a cylinder, a heating envelope around at least a part of said cylinder and spaced therefrom, a burner for supplying heat to the space between said envelope and cylinder to heat said cylinder, said burner being connected to a conduit having a valve therein, a heat responsive element in said space exposed to the heat of said burner, means for actuating said valve, connecting means between said heat responsive element and said actuating means by which said heat responsive element causes operation of said actuating means, conduit means connected into said heat responsive element for conducting a cooling medium thereto, and valve means for controlling the amount of cooling medium conducted through said conduit means to said heating element.

4. In a hot-gas engine, a cylinder, a heating envelope around at least a part of said cylinder and spaced therefrom, a burner for supplying heat to the space between said envelope and cylinder to heat said cylinder, said burner being connected to a conduit having a valve therein, a heat responsive element in said space exposed to the heat of said burner, means for actuating said valve, connecting means between said heat responsive element and said actuating means by which said heat responsive element causes operation of said actuating means, conduit means connected into said heat responsive element for conducting a cooling medium thereto, valve means for controlling the amount of cooling medium conducted through said conduit means to said heating element, and actuating means operatively connected to said valve means, said actuating means including means responsive to the pressure in said cylinder.

5. In a hot-gas engine, a cylinder, a reciprocable piston in said cylinder, crankshaft means, means linking said piston to said crankshaft means, a heating envelope around at least a part of said cylinder and spaced therefrom, a burner for supplying heat to the space between said envelope and cylinder to heat said cylinder, said burner being connected to a conduit having a valve therein, a heat responsive element in said space exposed to the heat of said burner, means for actuating said valve, connecting means between said heat responsive element and said actuating means by which said heat responsive element causes operation of said actuating means, conduit means connected into said heat responsive element for conducting a cooling medium thereto, valve means for controlling the amount of cooling medium conducted through said conduit means to said heating element, and actuating means operatively connected to said valve means, said actuating means including means responsive to the speed of rotation of said crankshaft means.

6. In a hot-gas engine, a cylinder, a reciprocable piston in said cylinder, crankshaft means, means linking said piston to said crankshaft means, a heating envelope around at least a part of said cylinder and spaced therefrom, a burner for supplying heat to the space between said envelope and cylinder to heat said cylinder, said burner being connected to a conduit having a valve therein, a heat responsive element in said space exposed to the heat of said burner, means for actuating said valve, connecting means between said heat responsive element and said actuating means by which said heat responsive element causes operation of said actuating means, conduit means connected into said heat responsive element for conducting a cooling medium thereto, valve means for controlling the amount of cooling medium conducted through said conduit means to said heating element, actuating means operatively connected to said valve means, said actuating means including means responsive to the speed of rotation of said crankshaft means, and also including means responsive to the pressure in said cylinder.

HERRE RINIA.
HEINRICH DE BREY.
WILLEM JAN VAN HEECKEREN.

REFERENCES CITED

The following references are of record in the file of this patent:

UNITED STATES PATENTS

| Number | Name | Date |
| --- | --- | --- |
| Re. 10,486 | Wilcox | June 3, 1884 |
| 1,822,133 | Doble | Sept. 8, 1931 |
| 2,285,288 | Krogh | June 2, 1942 |
| 2,336,232 | Doran | Dec. 7, 1943 |
| 2,394,253 | Nettel et al. | Feb. 5, 1946 |

FOREIGN PATENTS

| Number | Country | Date |
| --- | --- | --- |
| 240 | Great Britain | Jan. 30, 1860 |
| 315,514 | Great Britain | July 18, 1929 |
| 446,768 | Great Britain | May 6, 1936 |
| 34,493 | Germany | Jan. 27, 1886 |